May 20, 1941.  A. J. WENDLING  2,242,963
TRANSMISSION BELT
Filed Feb. 23, 1938  3 Sheets-Sheet 2
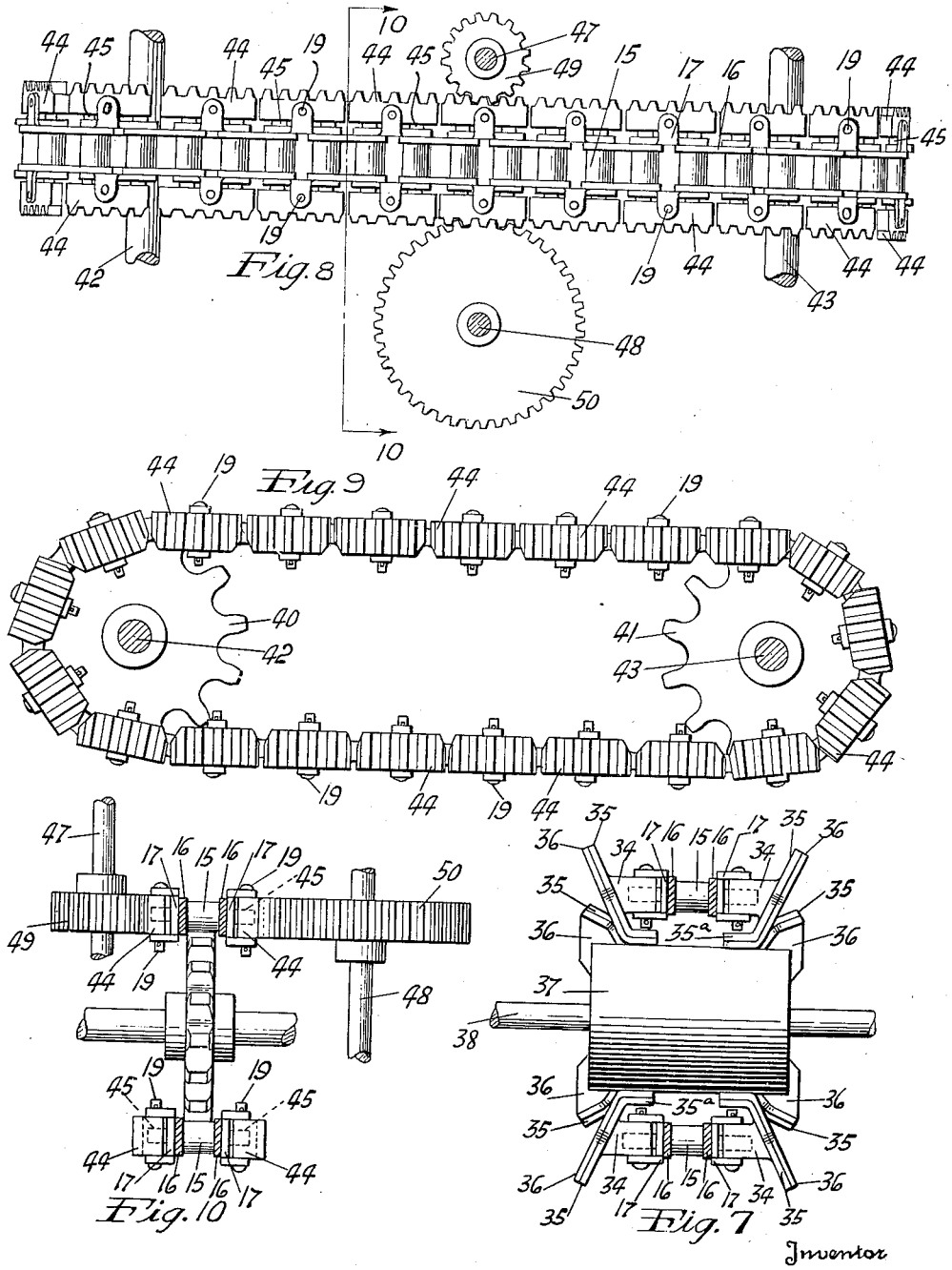
Inventor
Alfred J. Wendling May 20, 1941.  A. J. WENDLING  2,242,963
TRANSMISSION BELT
Filed Feb. 23, 1938  3 Sheets-Sheet 3
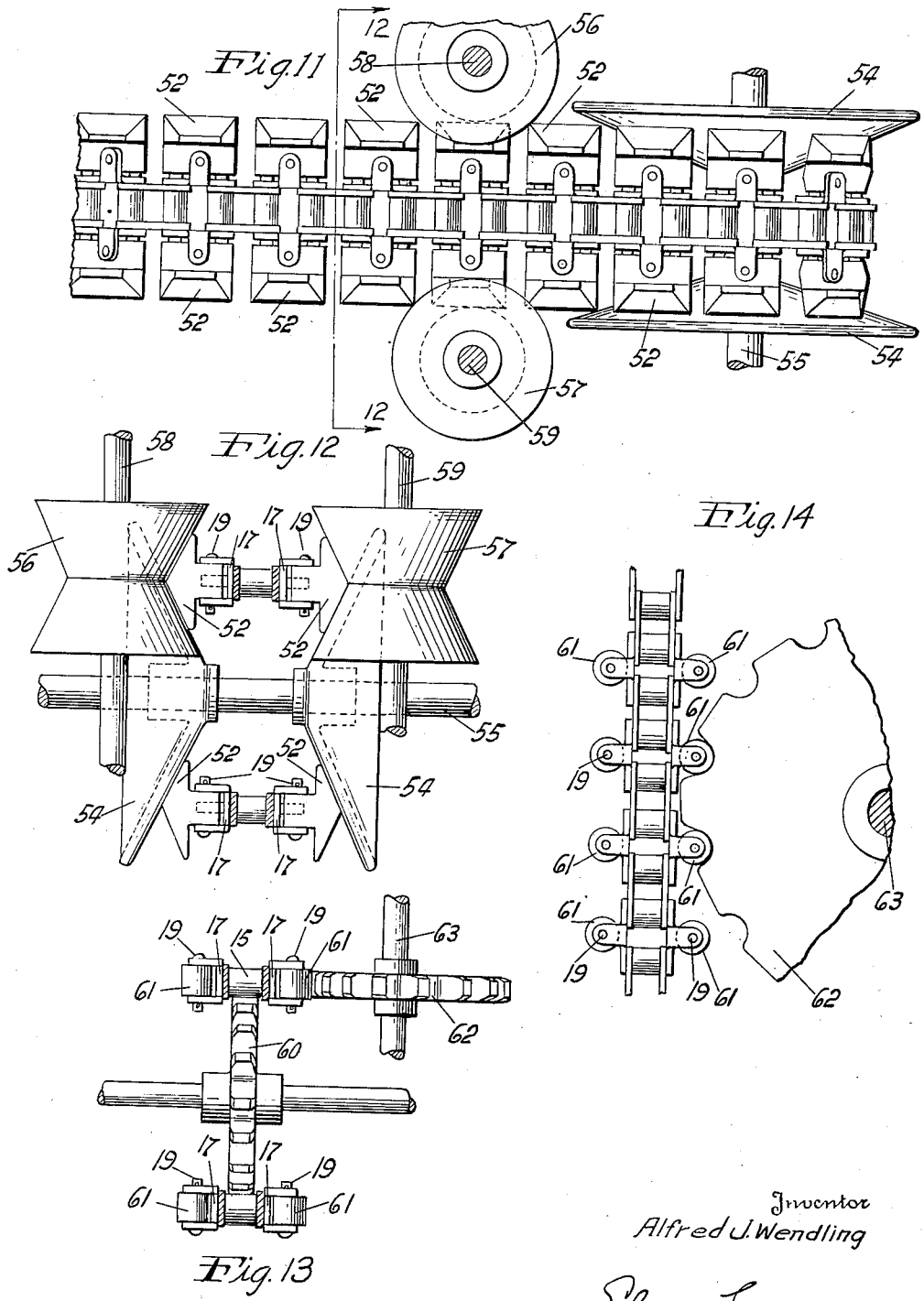
Inventor
Alfred J. Wendling
Ely & Frye
Attorneys Patented May 20, 1941

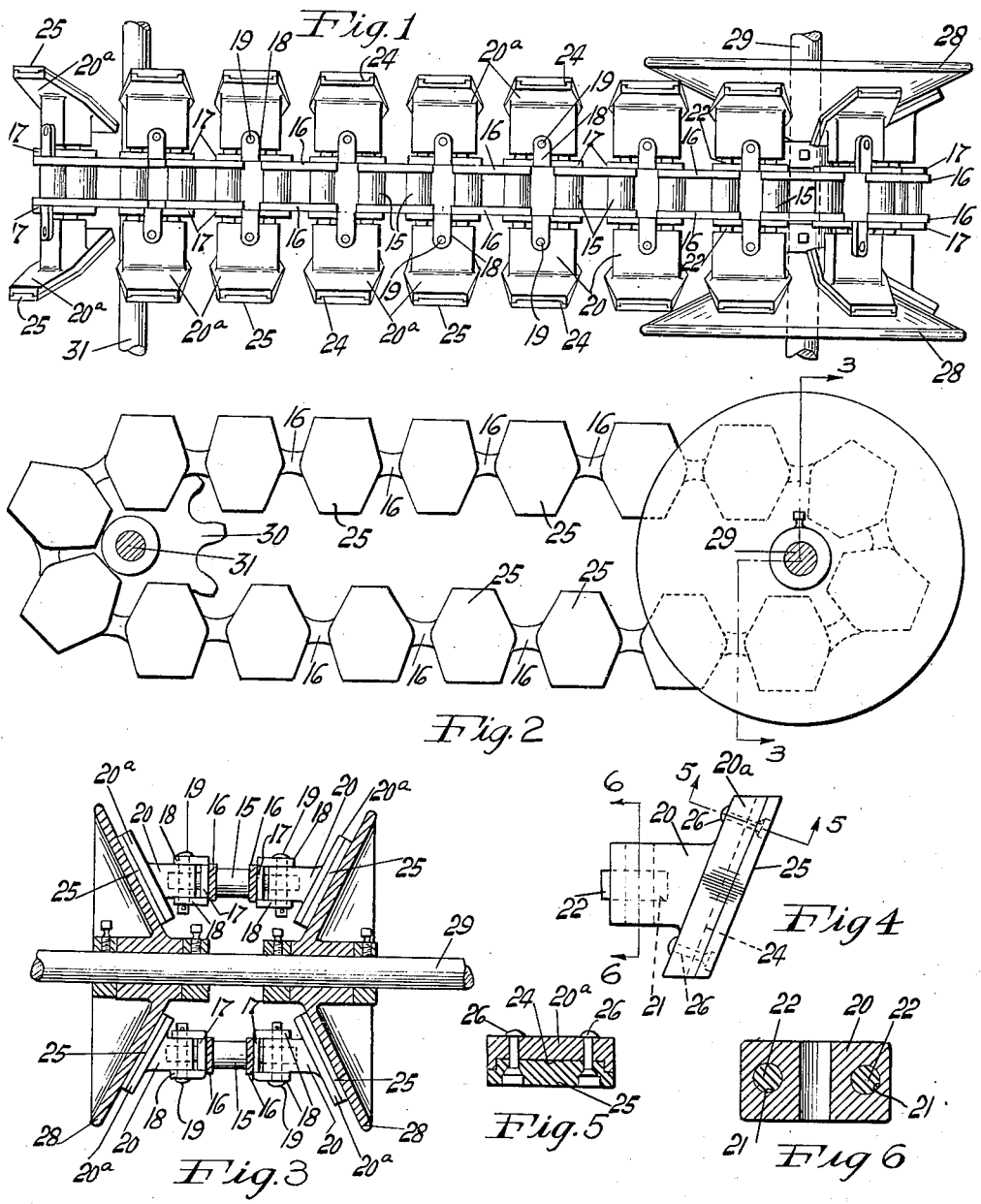

2,242,963

UNITED STATES PATENT OFFICE 2,242,963

TRANSMISSION BELT

Alfred J. Wendling, Huntington Park, Calif., assignor of eighty one-hundredths to Curt Uschmann, Huntington Park, Calif.

Application February 23, 1938, Serial No. 191,943

3 Claims. (Cl. 74—236)

This invention relates to transmission belts, and more especially it relates to transmission belts of the articulated type that comprise chain links for engagement with a sprocket to provide a positive drive, and elements carried by the chain links for driving engagement with other power-transmitting devices.

The invention contemplates that the driving elements carried by the chain links may be for frictional or for positive driving, and that said driving elements may be utilized for effecting rotation of shafts that are disposed transversely of the plane of the belt, or are disposed parallel to the plane thereof.

The chief objects of the invention are to provide a transmission belt of the character mentioned having improved means for mounting driving elements upon the chain links; to provide a construction enabling ready removal and replacement of the driving elements on the chain; to provide a construction that results in minimum wear on the driving elements and upon the pulleys that co-operate therewith; to provide a transmission belt having side-driving elements that may rock or pivot relatively of the chain links; and to provide a transmission belt of the character mentioned that has side-driving elements capable of driving pulleys rotating on axes transverse to the plane of the belt, or on axes disposed parallel to the plane of the belt. Other objects will be manifest as the specification proceeds.

Of the accompanying drawings:

Figure 1 is a plan view of one embodiment of the invention showing the endless transmission belt engaged at one end with a sprocket and at the other end with an adjustable double-cone pulley;

Figure 2 is a side elevation thereof;

Figure 3 is a section on the line 3—3 of Fig. 2;

Figure 4 is a detail elevation, on a larger scale, of one of the side-driving elements of the belt;

Figure 5 is a section on the line 5—5 of Fig. 4;

Figure 6 is a section on the line 6—6 of Fig. 4;

Figure 7 is a section through the belt showing another embodiment of the side-driving elements that are also adapted for driving engagement with a cylindrical pulley;

Figure 8 is a plan view of another embodiment of the invention having side-driving elements constructed for positive driving engagement with driven elements rotating on axes disposed parallel to the plane of the belt;

Figure 9 is a side elevation of the transmission belt shown in Fig. 8, the intermediately positioned gears being omitted;

Figure 10 is a section on the line 10—10 of Fig. 8;

Figure 11 is a fragmentary plan view of another embodiment of the invention having side-driving elements constructed for frictional driving engagement with driven elements rotating on axes disposed parallel to the plane of the belt;

Figure 12 is a section on the line 12—12 of Fig. 11;

Figure 13 is a transverse section of another embodiment of the invention; and

Figure 14 is a plan view, on a larger scale, of the structure shown in Fig. 13.

Referring now to Figs. 1 to 6 of the drawings, there is shown a transmission belt comprising an articulated link chain of which 15, 15 are transversely extending rollers, and 16, 17 are respective series of links disposed on both sides of the chain. At each side of the chain there are the usual links 16 each having two of the cross pins (not shown) passing therethrough, the rollers 15 being journaled on the respective cross pins. The arrangement is such that the links 16 connect in pairs two of the cross pins of the chain.

Each of the links 17 has two of the cross pins extending therethrough at opposite ends thereof, and these links overlap adjacent ends of two of the links 16, and are disposed laterally outside the latter. As shown most clearly in Figs. 1 and 3, the links 17 are of special construction, each of them being formed on its respective longitudinal margins with laterally extending ears 18, 18, which ears are parallel to each other, the ears on opposite sides of the chain extending in opposite directions away from the medial plane of the belt. The ears of each link 17 are apertured to receive a pivot pin 19 upon which is pivotally mounted a side-driving element 20 of metal, said pivot pins being disposed transversely with relation to the direction of driving movement of the belt. That portion of the element 20 that receives the pivot pin 19 is disposed between the ears 18, and has a lateral face that normally is disposed parallel to the adjacent lateral face of the link 17, and is in spaced relation thereto. The aforesaid lateral face of the element 20 is formed with recesses 21, 21 that are disposed on opposite sides of the pivot pin 19, and in each of said recesses is a resilient member 22 that projects therefrom, and spans the space between the driving element and lateral face of link 17 so as yieldingly to bear against the latter. The resilient members 22 are shown herein as rubber cushions under light compression, but it will be understood that other yielding structures, such as compression springs, may be used if desired. The arrangement is such that the side-driving elements have limited pivotal movement (about $\frac{1}{32}$ inch) about their pivot pins 19, with the result that the elements more readily engage the surface of tapered pulleys, and there is less wear on the driving elements and pulleys.

Each side-driving element 20 has a portion 20a that is integral therewith, and is slanted or sloped, the portions 20a on opposite sides of the belt being oppositely sloped so as roughly to define a V-shape, whereby the driving elements may engage the respective sides of a double-cone pulley. The outer lateral face of each sloped portion 20a is recessed or grooved at 24, which recess receives a similarly shaped tenon formed on a friction facing 25 that is secured to the portion 20a by rivets 26 that seat in suitable recesses in said friction facing. The latter may be molded of any material suitable to the situation in which the belt is used. Thus the facings may be of composition suitable for operating in oil, or they may be of rubber composition and can be run dry or in water.

The side-driving elements are arranged to engage the opposed tapered surfaces of cones 28, 28 that constitute a double cone pulley, which pulley is mounted upon the usual shaft 29. At the other end of the belt the chain links of the belt engage the usual sprocket 30 that is mounted upon a shaft 31, the latter being parallel to the shaft 29. The cones 28 are adjustable toward and away from each other to provide a variable speed drive between shafts 29 and 31.

The use of a sprocket chain in a side-driving belt provides maximum strength with narrow width. It makes possible the provision of a positive drive with a variable speed drive, whereby infinite speed control is obtained. The use of a link chain also simplifies the problem of altering the length of the belt to adapt it to various situations. The friction facings on the side-driving elements are removable, so that they may be replaced when worn, and it is possible to provide friction facings suitable for various conditions of service, as for operating in water or in oil, or for dry use. The pivotal mounting of the side-driving elements is of primary importance since it enables the said elements readily to engage other frictional driving mechanisms with good frictional contact, the presence of the resilient members 22 normally holding the side-driving elements in determinate position, but enabling them yieldingly to depart therefrom to a limited extent.

In the embodiment of the invention shown in Fig. 7, the sprocket chain, including special links 17, is identical with that previously described, the difference residing in the shape of the side driving members which enables them to have frictional driving engagement with cylindrical pulleys as well as with tapered pulleys. The side driving elements, generally designated 34, are similar to the analogous elements of the previously described embodiment in the feature of the slanted or oblique portions 35, but those ends of the latter that are innermost when the belt is passing around a pulley are formed with laterally extending portions 35a, of which those on one side of the chain extend toward those on the other side of the chain and are disposed in the same plane with those directly opposite. Secured to the outer lateral faces of oblique portions 35, in the same manner as in the previously described embodiment, are respective friction facings 36 that extend onto the laterally extending portions 35a. The arrangement is such that the belt may pass about a cylindrical pulley, such as the pulley 37 on shaft 38, and have frictional driving engagement therewith, and at the same time have driving engagement with a double-cone pulley (not shown) at another region of its course.

The embodiment of the invention shown in Figs. 8 to 10 inclusive differs from those previously described in that it is arranged for positive instead of frictional driving, and also is adapted to impart rotary motion to one or more shafts disposed on axes that are parallel to the plane of the belt. This embodiment of the invention comprises a sprocket chain, including special links 17, that is identical with the chains previously described, the chain being trained about two sprockets 40, 41 to provide positive drive between parallel shafts 42, 43 upon which said sprockets are mounted. Pivotally mounted upon the pivot pins 19 carried by links 17 are respective gear rack units 44, 44 which, in the straight reaches of the belt between sprockets, are disposed end to end so as to constitute a continuous rack. The innermost corners of the racks are beveled as shown to permit them to pass around the sprockets without interfering with each other. Inset into the rear face of each rack unit 44 are resilient rubber cushions 45, 45 that are disposed on opposite sides of the pivot pin 19 and compressed against the adjacent face of the link 17, in a manner similar to the resilient members 22 previously described.

Between shafts 42, 43 are shafts 47, 48 that are disposed on opposite sides of the belt parallel to the plane thereof, and transversely with relation to said shafts 42, 43. Mounted on shafts 47, 48 are respective spur gears 49, 50 that mesh with the gear racks 44 on opposite sides of the belt, the arrangement being such that shafts 47, 48 are positively driven whenever the transmission belt is in motion. Preferably the shafts 47, 48 are directly opposite each other so that the thrust set up by the meshing of the gear teeth on one side of the belt is balanced or offset by the thrust on the other side thereof. In practice either one or both shafts 47, 48 may be utilized for delivering power, and by changing the sizes of the gears 49, 50 it is possible to obtain various speed reductions as desired. It will be observed that shafts 47 and 48 will rotate in opposite directions, which feature of the construction may be usefully employed in some situations. It will be observed that the gears 49, 50 may engage the racks of the transmission belt anywhere between the sprockets 40, 41, and they may engage either the upper or the lower reach of the belt, whereby the utility of the arrangement is enlarged.

The embodiment of the invention shown in Figs. 11 and 12 is similar to that shown in Figs. 8 to 10 in that it is arranged to impart rotary motion to one or more shafts disposed parallel to the plane of the belt, but differs from the latter in that it is adapted for frictional driving. The belt comprises a sprocket chain, including special links 17, that is identical with the chains previously described. Pivotally mounted upon the pivot pin 19 of links 17 are respective driving elements 52, 52 that are quite similar to the driving elements 20 previously described except that each element 52 has its driving face reversely slanted or sloped from its longitudinal centerline toward opposite sides thereof, so that it has a wedge-shaped appearance. Said driving face may be provided with a facing of friction material if desired. The usual rubber cushions under compression are interposed between the elements 52 and the links 17 in the manner and for the purpose previously set forth.

As shown in the drawings, one end of this belt has frictional driving engagement with the cones 54, 54 of a double cone pulley that is mounted on shaft 55. The other end of the belt (not shown) may be carried by a sprocket. At any point between the latter and the cones 54 the driving elements 52 have frictional driving engagement with a pair of waisted or double cone pulleys 56, 57 that are mounted upon respective shafts 58, 59, the latter being positioned on opposite sides of the belt with their axes disposed parallel to the plane of the belt and at right angles with relation to shaft 55. The arrangement is such that the shafts 58, 59 are driven in opposite directions, the size of the pulleys 56, 57 determining the speed of said shafts. The pulleys 56, 57 are positioned directly opposite each other so that the belt is required to pass therebetween, with the result that it is possible to obtain adequate driving friction by positioning the pulleys close enough together to crowd the belt.

The embodiment of the invention shown in Figs. 13 and 14 is adapted for positive drive between two sprockets, and for positive drive with one or more rotary members disposed on shafts that are parallel to the plane of the belt. This embodiment of the invention comprises a sprocket chain including special links 17 identical with those previously described. In Fig. 13 is shown one of the sprockets, designated 60, about which the chain is trained and which drives it. Journaled on the pivot pins 19 of the special links 17 are respective rollers 61. The latter have driving engagement with one or more sprockets disposed laterally of the belt and mounted upon shafts disposed parallel to the plane of the belt, one such sprocket being shown at 62 mounted upon a shaft 63.

It will be seen that the invention is adaptable for efficient use in a number of different situations, and that it achieves the other advantages set out in the foregoing statement of objects.

Other modifications may be resorted to without departing from the spirit of the invention, or the scope thereof as defined by the appended claims.

What is claimed is:

1. In a transmission belt, the combination of a sprocket chain extending lengthwise of the belt, and side-driving elements carried by the chain and projecting laterally from opposite sides thereof, each of said side-driving elements comprising a metal structure pivotally attached to the chain and having a removable driving facing consisting of friction material having a tenon and groove connection therewith.

2. A combination as defined in claim 1 in which the tenon and groove extend transversely of the direction of travel of the belt.

3. In a transmission belt, the combination of a sprocket chain extending lengthwise of the belt, said chain having cross pins, longitudinally extending links pivotally connected by said cross pins, certain of said links carrying pins which are disposed transversely with relation to the aforesaid cross pins and with relation to the direction of driving movement of the belt, and side-driving elements pivotally mounted upon the pivot pins, each of said side-driving elements comprising a shoe having a removable driving facing consisting of friction material interlocked with the outer face of the shoe.

ALFRED J. WENDLING.